United States Patent [19]

Brocard et al.

[11] 4,218,702

[45] Aug. 19, 1980

[54] MEANS FOR REMOTE CONTROL OF AN AIRCRAFT VIDEO SYSTEM FOR SURVEYING GROUND ACTIVITY

[75] Inventors: François Brocard, Paris; André Denizot, Le Perreux; Marcel Dif, Orsay, all of France

[73] Assignee: Societe Nationale Industrielle, Paris, France

[21] Appl. No.: 905,605

[22] Filed: May 12, 1978

[30] Foreign Application Priority Data

May 18, 1977 [FR] France .................. 77 15221

[51] Int. Cl.² ............................................. H04N 7/18
[52] U.S. Cl. .................................... 358/109; 200/6 A; 354/74; 358/210
[58] Field of Search ............... 358/103, 109, 229, 87, 358/210, 222; 200/6 A; 354/74

[56] References Cited

U.S. PATENT DOCUMENTS

| | | | |
|---|---|---|---|
| 2,397,978 | 4/1946 | Paulus et al. ................ | 200/6 A |
| 2,931,858 | 4/1960 | Hammond, Jr. et al. ..... | 358/109 |
| 3,226,476 | 12/1965 | Tyler .......................... | 358/229 |
| 3,469,260 | 9/1969 | Holt et al. .................. | 358/103 |
| 3,638,502 | 2/1972 | Leavitt et al. ............... | 358/109 |
| 3,641,261 | 2/1972 | Chaplin et al. .............. | 358/210 |
| 3,780,224 | 12/1973 | Levine ........................ | 358/87 |
| 3,934,250 | 1/1976 | Martin, Jr. .................. | 343/6 TV |
| 3,984,628 | 10/1976 | Sharp ......................... | 358/183 |
| 4,001,499 | 1/1977 | Dowell ........................ | 343/6 TV |

FOREIGN PATENT DOCUMENTS 1959941 6/1971 Fed. Rep. of Germany .
844430 7/1939 France .
2175601 10/1973 France .
2265616 3/1974 France .

OTHER PUBLICATIONS

Airborne Surveillance System-Microwave Journal-Feb. 1971, p. 69.
Shigeta et al.-Design of the NHK Helicopter Color Camera System-NHK Tech. Jour. (Japan) vol. 23, No. 2, 1971.

Primary Examiner—Robert L. Griffin
Assistant Examiner—Joseph A. Orsino, Jr.
Attorney, Agent, or Firm—Karl W. Flocks

[57] ABSTRACT

A method of remote control of an aircraft video system and means especially adapted for carrying out said method. An aircraft carries a technical container comprising at least one TV camera monitored by a TV screen and remotely controlled by a control box in the pilot's cockpit. On the ground there are disposed an orientable aerial, a receiver, a remote-control box for the aerial, a VHF microphone and a magnetoscope.

By using this system an operator in the aircraft can both keep stability of the image transmitted to the ground and monitor it by enlargement on the monitor TV screen through instinctive reaction upon the remote-control box in the cockpit.

The operator can act on his own initiative or on instructions being received from the ground or possibly by way of a duplex system.

5 Claims, 8 Drawing Figures

MEANS FOR REMOTE CONTROL OF AN AIRCRAFT VIDEO SYSTEM FOR SURVEYING GROUND ACTIVITY

When the activities on the ground are surveyed by means of an aircraft equipped with a video system, the latter may comprise a stabilized platform to eliminate instability effects resulting from the aircraft motions.

Moreover, when the usual video equipments are to be made operational aboard a light aeroplane, a so-called "aircraft" system must be developed, i.e. a system which is lightweight, as little cumbersome as possible, reliable and easy to operate.

The means employed heretofore and those known in this field to the Applicant do not meet all these requirements because the stabilized platforms which are generally used are heavy and cumbersome and cannot be installed aboard a light aircraft such as, for instance a touring aeroplane.

However, there are cases in which the utilization of a light aircraft equipped with a video system is very desirable. It is the case, for instance during surveyance of the road traffic when the observation is effected by an operator aboard the aircraft, while transmission of images is effected in the direction of the ground toward an operational headquarter which can itself be mobile, for instance on a video truck.

If, for the above reasons the stabilized platform has to be eliminated, means have to be provided for compensating for the instability effects resulting from aircraft motions but these means must remain lightweight, simple to operate and little cumbersome.

To substantiate this, it will be noted that an exemplifying system as described in the French patent application 2,069,852, comprising a platform stabilized by at least three gyroscopes and angular deviation measuring devices, cannot at all be adapted for installation aboard a light aircraft due to its weight, bulkiness and intrinsic complexity.

The usual video systems can be used but to eliminate servitudes of the abovementioned type it is necessary to be able:

to take advantage of simple means for remote control of the TV camera, to produce, instinctively, spatially stable images taking into account the attitude of the aircraft, with possible focusing and enlargement of the image of those items which the operator wants to more particularly observe;

to constitute a removable and easily adaptable, aircraft technical unit; and to integrate all the parts of the display units into a homogeneous assembly, both aboard the aircraft and on the ground.

SUMMARY OF THE INVENTION

It is therefore an object of this invention to provide a method of remote control of a lightweight aircraft video system for the surveyance of activities on the ground, which associates in a homogeneous combination the whole of the required means thereby to permit production of spatially stable images with controlled field of vision.

The invention has also for its object the combination of means for carrying out the method, which substantially comprises a removable technical container aboard the aircraft including a TV camera remotely controlled from the pilot's cockpit and a TV transmitter, on the one hand, and on the other hand, in the cockpit, a remote-control box and a TV monitor screen and, on the ground, complementary equipment such as a TV monitor receiver as well as the usual members contained in a technical unit.

Additional features, advantages and objects of the invention will appear from the following description in which possible forms of embodiment of the invention have been set forth in detail in an explanatory and not limitative fashion in the accompanying drawing.

BRIEF DESCRIPTION OF THE DRAWING

Referring to FIG. 1, the installation consists as a whole of a light aircraft A supporting, for instance under its right-hand wing, a technical container I comprising the TV camera, remotely controlled and orientable in angle of sight and heading, with zoom and diaphragm adjustment, on the one hand, and on the other hand, a transmitter 27 retransmitting images to the ground in the direction of an equipment which comprises an orientable aerial 2 connected to a technical centre in which there are a TV receiver 3, a monitor video unit 4, an aerial servo-control or remote-control box 5, a VHF microphone 6 and a magnetoscope 7. The transmission aerial lies at the most suitable place for hertzian transmission.

Figure 1:
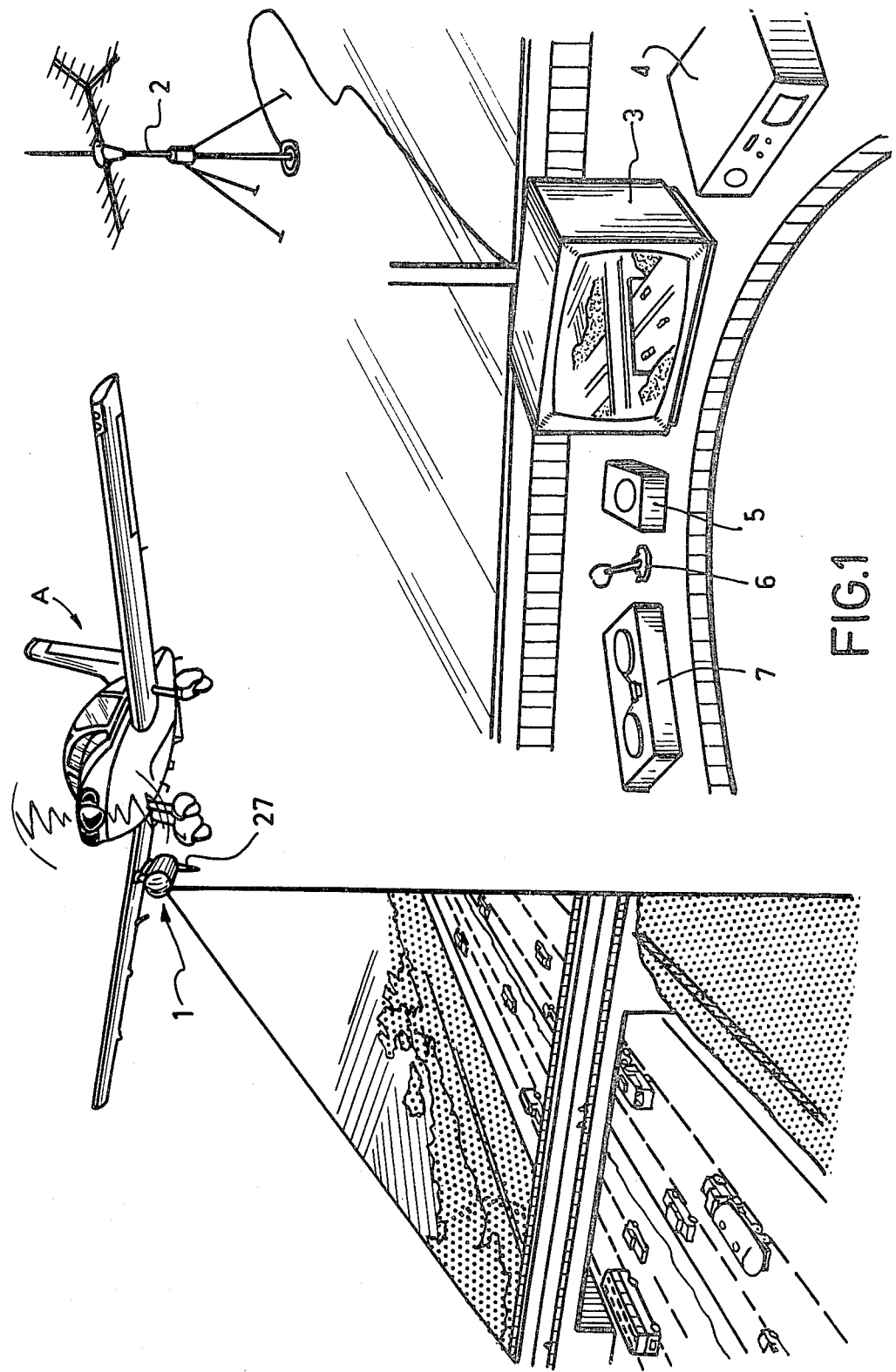
FIG. 1 is a schematic view illustrating the combination of means utilized according to the invention.
Figure 2:
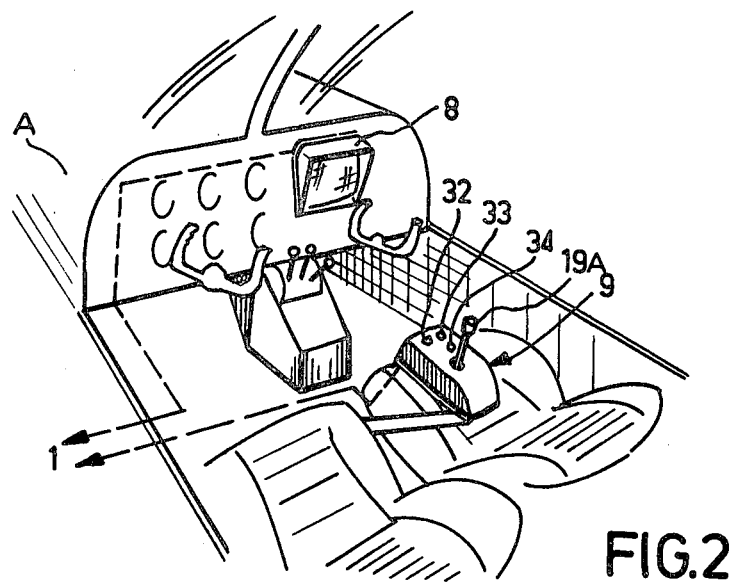
FIG. 2 is a partial schematic view of the pilot's cockpit aboard the survey aircraft, according to FIG. 1.

Aboard the aircraft A, as shown in FIG. 2, the pilot's cock-pit includes a video monitor screen 8 and a remote-control box 9 for controlling the TV camera.

Figure 3:
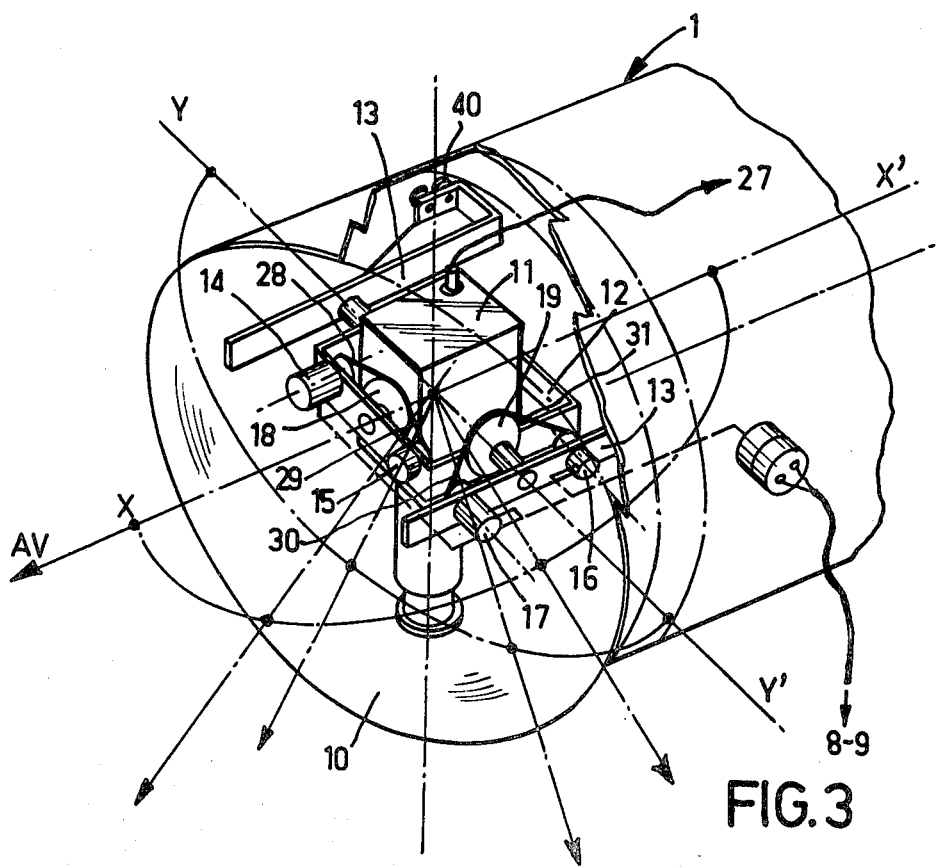
FIG. 3 is a partial schematic view showing the installation of the TV camera within the aircraft technical container according to FIG. 1.

The technical container 1 comprises in its forward portion as shown in FIG. 3, a transparent radome 10 for protecting the TV camera II and its mechanisms of sight and azimuth drive.

For the intended purpose the camera II is movable in righthand-lefthand rotation (azimuth) within a cradle 12 about axis x,x′ substantially parallel to the aeroplane axis.

The cradle 12 is itself movable in up-down (angle of sight) rotation within a cradle 13 secured to the container, about the axis y,y′ substantially perpendicular to the aeroplane axis.

Elastic suspension means 40 are used to insulate from vibrations the cradle 13 supporting camera II.

Obviously, in this type of installation displacement of the camera is maximal in both directions and remote-control can be provided simply by means of two mechanisms in the manner described hereinbelow in reference to FIG. 3.

A first azimuth-rotation mechanism comprises a motor with a pulley 14 connected to cradle 12, a pulley 18 connected to the camera II and a transmitting cable 28 passing through a tension regulator constituted by an S-shaped tubular part (not shown).

A rotary potentiometer 15, the function of which will be explained hereinafter and which is connected to the cradle 12, is also connected by a cable 29 to the pulley 18, said cable also passing through an S-shaped tension regulator (not shown).

A second mechanism, for sight-rotation, similarly comprises a motor with a pulley 17 connected to the cradle 13, a pulley 19 connected to the cradle 12 and a transmitting cable 30 passing through a tension regulator constituted by an S-shaped tubular part (not shown).

A rotary potentiometer 16, the function of which will be explained later and which is connected to the cradle 13 is also connected through a cable 31 to the pulley 19, said cable also passing through an S-shaped tension regulator (not shown).

A standard electrical remote-control unit for objectlens (zoom and diaphragm) focusing is further mounted on the camera in a manner known per se.

Figure 4:
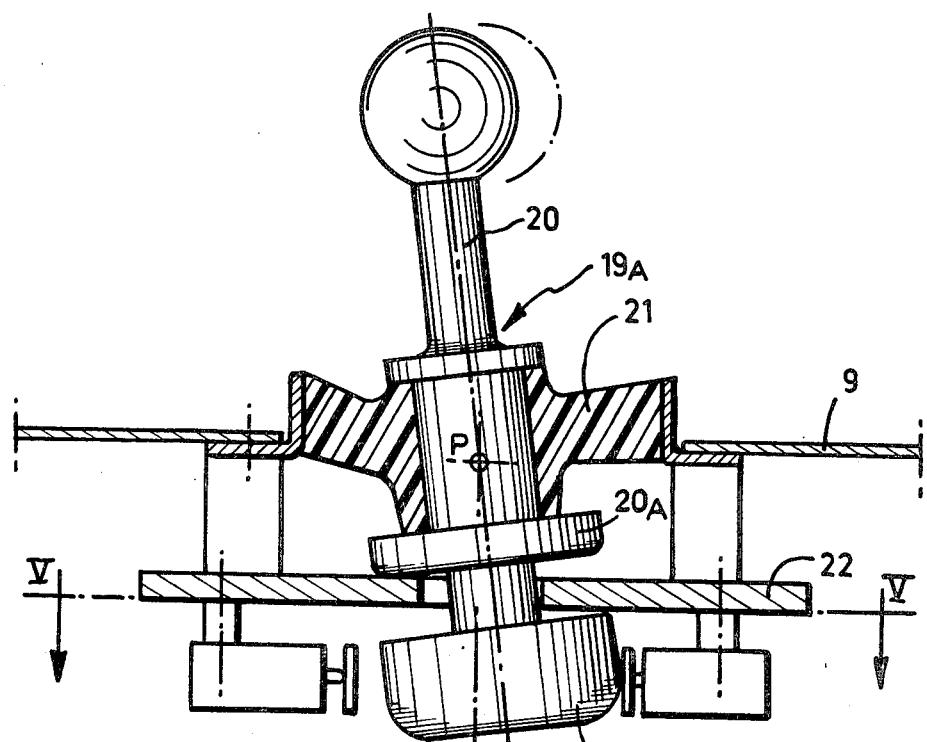
FIGS. 4 and 5 are respective side and plane views of the remote control lever of the TV camera.

Control of the motors 14 and 17 of the mechanisms is effected in the manner described hereinafter in reference to FIGS. 4 and 5 and the electric diagram of FIG. 6.

The remote control box 9 comprises a remote control lever 19 A on the one hand, and on the other hand a reversing switch for controlling the zoom motor 32 and for controlling the diaphragm motor 33, whereas an ON-OFF switch 34 for the TV transmitter is connected to the aeroplane bus-bar.

The remote-control lever 19A is formed with a joint axis 20 lodged in an elastic suspension 21 and its angular displacement takes place about an imaginary virtual point P.

Figure 6:
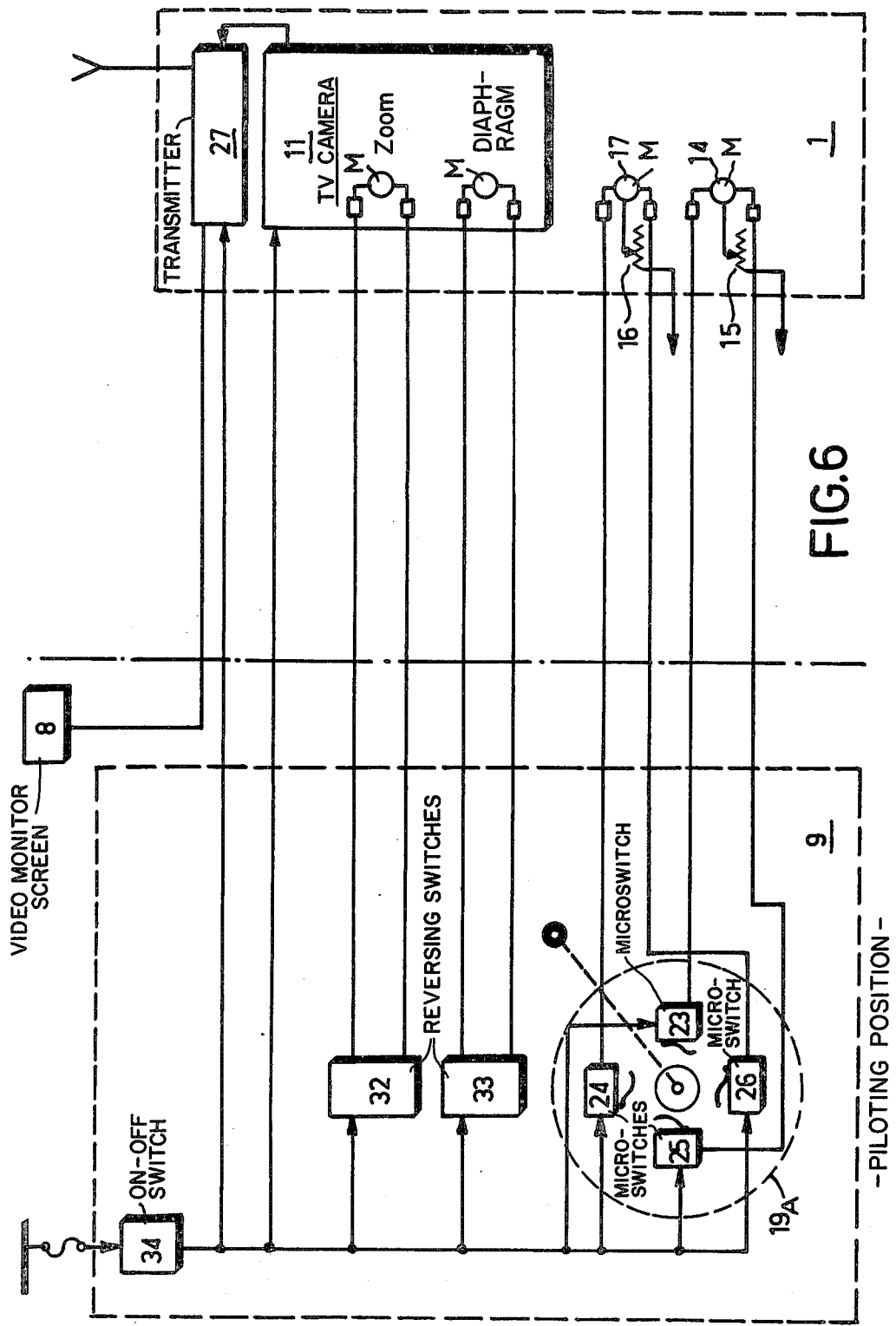
FIGS. 6 and 7 are electric diagrams of the assembly aboard the aircraft.

A perforate plate 22 limits displacement of said axis 20 which in its turn permits its lower portion to actuate microswitches 23, 24, 25 and 26 which are connected to motors 14 and 17 for orientation of the camera II according to the diagram of FIG. 6.

Figure 5:
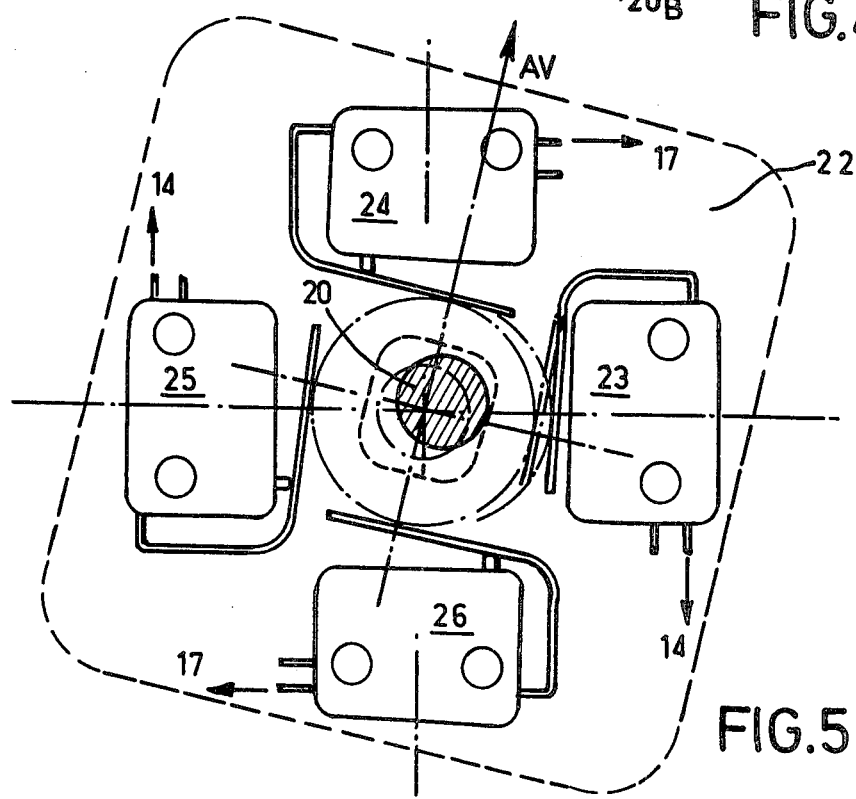

In this way, as shown in detail in FIG. 5, the lefthand motion of axis 20 will, for instance move said lower portion toward micro-switch 23 which will feed motor 14 in the proper direction for moving camera II to the left-hand side.

Two conjugated actions are possible in view of the pseudo-square opening in plate 22 which actually permits conjugated action, for instance, on both microswitch 23 and micro-switch 24 thereby bringing the camera into a forward left-hand orientation.

The displacements of axis 20 are limited, due to the special configuration of its active end 20A-20B, which is protuberant on both sides of its median portion, itself included in the opening of the plate 22 such that any undesired action upon the micro-switches is prevented.

The potentiometers 15 and 16 can provide electrical information representing the angular sight and azimuth positions of the camera II.

Moreover, limit switches (not shown) set boundaries in both directions to the displacement of the camera.

Figure 7:
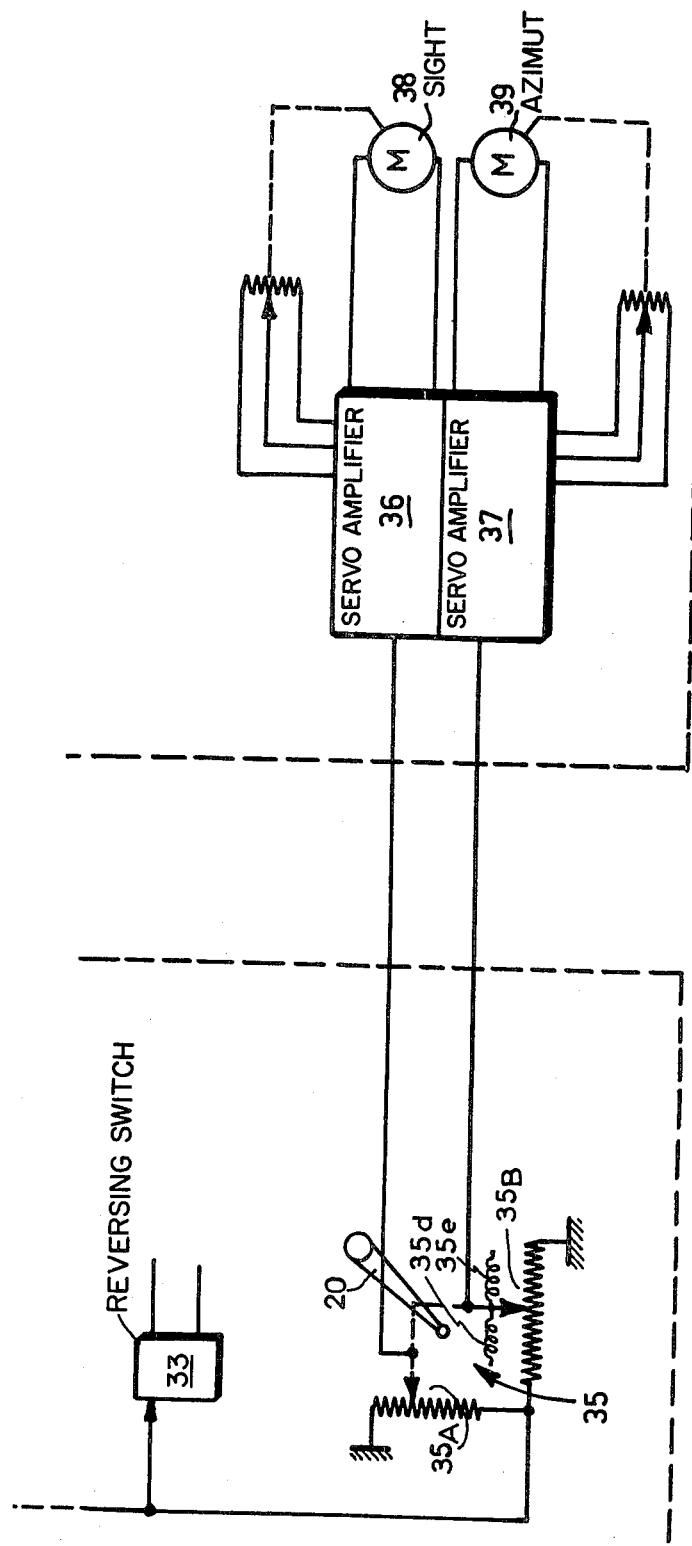

In another form of embodiment shown in FIG. 7, the control unit of the motors has been replaced by an amplifier unit.

In this arrangement the remote control box 35 comprises potentiometers 35A-35B having cursors linked to axis 20 and connected to servo-amplifiers 36, 37 which supply power to the motor 38 for control of angular sight on the one hand, and on the other hand to the motor 39 for azimuth control.

Furthermore, return springs 35d and 35e are used for bringing the lever 20 to the median point.

It will be noted that the operator in the pilot's cockpit has at his disposal simple means for instinctively stabilizing the image on the one hand and on the other hand means for acting upon the image to possibly show more clearly those items on the ground which he wants to observe with more attention.

Thus the normal motions of flight—pitching, rolling and yaw—will be compensated for in the image transmitted to the ground for the benefit of the observer in so far as the operator was able to act instinctively upon the available controls, namely the remote-control lever and/or the zoom and diaphragm controls.

This artificial stability can be preserved even in the event that enlargement of the image should be desired to perceive details on the ground, and thus closer enquiry can be made either on the operator's initiative or on his receiving instructions from the ground or also on direct remote control signal being transmitted in duplex by the observer at the central station.

Figure 8:
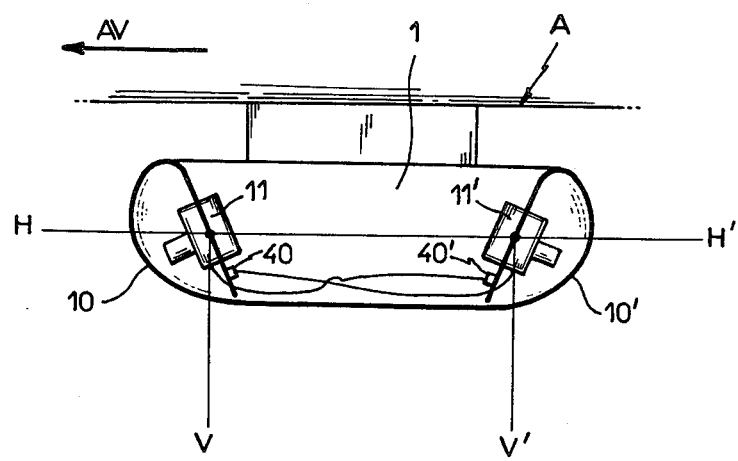
FIG. 8 is a schematic view of another form of embodiment with two cameras.

When the operator wishes to extend the observation to beyond the optical field permitted by the camera II mounted in the container I, the other form of embodiment outlined in FIG. 8 can advantageously be utilized.

According to this form of embodiment the camera II disposed at the front of the container I becomes the "pilot" camera. A second camera II', the "slave" camera, is added to the pilot camera II, said slave camera being lodged in a second radome 10' mounted at the rear of the technical container I. The second camera II' permits extension of the optical field in the rearward direction. For this purpose, the camera II' is provided with remote-control means similar to those of camera II.

Both cameras in their respective cradles then act upon respective limit switches 40 and 40' controlling reversing switches to permit selection of the appropriate video image (pilot or slave camera) and switching off of the unused camera.

In other words, when the pilot camera reaches the vertical limit V the slave camera is brought into operation under the action of the pilot camera limit-switch thereby replacing the pilot camera for the continuity of the observation in the rearward direction, this replacement occurring of course both ways.

Moreover, the hertzian connections are produced in the usual manner both for the image and the sound, which are demodulated on the ground; similarly, normaly VHF connection is used for communicating instructions.

Therefore it is clear now that the invention provides such a homogeneous combination of means by which the abovementioned objects can be achieved.

This combination authorizes the employment of generally known means which, to the applicant's knowledge, have heretofore never been assembled in this manner. Therefore a simple unit is provided which permits air surveyance under proper conditions for transmitting images within a range of 30 km from a plane flying at a height of about 300 m and of more than 80 km when the plane flies at 1000 m.

This invention has, of course, been described and represented by way of a preferential embodiment only and equivalents to its constitutive elements can be substituted therefor without departing from the scope of the invention which is defined by the following claims.

We claim:

1. An aircraft video system utilizing an aircraft and operation on board intended for air surveyance of ground activity comprising
    a technical container attached to the aircraft, a transparent radome forming a forward portion of said container, a pilot camera inclinable in angle of sight and azimuth located in said radome, a television monitor screen in the aircraft connected to said camera, a remotely controlled inclination means for controlling inclination and for controlling the object-lens of said camera in said radome connected to said camera, a television transmitter with its transmission aerial in a rearward portion of said container, said remotely controlled means including a structure secured to said container through damping means, a cradle connected to said structure, a first means for pivoting said camera in azimuth with respect to said cradle, a second means for pivoting in sight said cradle with respect to said structure, electric motors having pulleys with two directions of rotation connected to further pulleys linked to said camera, and said electric motors also connected through cables to said cradle, a remote-control box connected to said remotely controlled means located to be acted upon by instinctive reaction of the operator while observing said television monitor screen, said remote-control box including a pivoted axis shaft pivoted in an elastic block, four microswitches controlling said electric motors for controlling camera inclination, said shaft having a lower portion which acts upon said microswitches, a plate in said box having a psuedo-square opening therein, said lower portion of said shaft having protuberant parts on either side of a portion of said shaft itself included in said psuedo-square opening to prevent undesired action on said microswitches by allowing only limited deviations of said shaft.

2. An aircraft video system in accordance with claim 1, further characterized by a second radome formed in a rearward portion of said technical container, a slave camera in said second radome, connected to said television monitor screen, a second cradle pivotly supporting said slave camera, limit switches controlling reversing switches located for actuation by said pilot and slave cameras to permit selection of a pertinent video display from one of said cameras, and the switching off of the unused camera.

3. An aircraft video system as in claim 2 wherein at least said pulleys linked to said camera and said cradle are also connected to potentiometers providing electrical information relative to the position of the camera.

4. An aircraft video system in accordance with claim 1, further characterized by said remotely controlled means further including servo amplifiers controlling said electric motors, potentiometers mounted in said remote-control box and connected to said servo amplifiers.

5. An aircraft video system utilizing an aircraft and operation on board intended for air surveyance of ground activity comprising a technical container attached to the aircraft, a transparent radome forming a forward portion of said container, a pilot camera inclinable in angle of sight and azimuth located in said radome, a television monitor screen in the aircraft connected to said camera, a remotely controlled inclination means for controlling inclination and for controlling the object-lens of said camera in said radome connected to said camera, a television transmitter connected to said camera, said remotely controlled means including a cradle connected to said container, a first means for pivoting said camera in azimuth with respect to said cradle, a second means for pivoting in sight said cradle with respect to said container, electric motors connected to said camera, and to said cradle, a remote-control box connected to said remotely controlled means located to be acted upon by instinctive reaction of the operator while observing said television monitor screen, said remote-control box including a pivoted axis shaft, microswitches controlling said electric motors for controlling camera inclination, said shaft having a portion which acts upon said microswitches a plate in said box havng an opening therein, said portion of said shaft having protuberant parts on either side of a portion of said shaft itself included in said opening to prevent undesired action on said microswitches by allowing only limited deviations of said shaft.

* * * * *